US012610128B2

(12) United States Patent
Kim et al.

(10) Patent No.: US 12,610,128 B2
(45) Date of Patent: Apr. 21, 2026

(54) METHOD AND SYSTEM FOR MEASURING COPLANAR POINT DISTANCES USING AN RGB-D CAMERA

(71) Applicant: Charles River Analytics, Inc., Cambridge, MA (US)

(72) Inventors: Min T. Kim, Lexington, MA (US); Stan German, Boston, MA (US)

(73) Assignee: Charles River Analytics, Inc., Cambridge, MA (US)

( * ) Notice: Subject to any disclaimer, the term of this patent is extended or adjusted under 35 U.S.C. 154(b) by 26 days.

(21) Appl. No.: 18/504,284

(22) Filed: Nov. 8, 2023

(65) Prior Publication Data

US 2024/0155220 A1 May 9, 2024

Related U.S. Application Data

(60) Provisional application No. 63/382,737, filed on Nov. 8, 2022.

(51) Int. Cl.
*H04N 23/611* (2023.01)
*G06V 10/44* (2022.01)
(Continued)

(52) U.S. Cl.
CPC ......... *H04N 23/611* (2023.01); *G06V 10/454* (2022.01); *G06V 40/166* (2022.01);
(Continued)

(58) Field of Classification Search
CPC .... H04N 23/611; H04N 23/84; H04N 23/951; G06V 10/454; G06V 40/166;
(Continued)

(56) References Cited

U.S. PATENT DOCUMENTS

2014/0218680 A1* 8/2014 Wilson ................. G02C 13/005
                                                     351/204
2015/0243031 A1* 8/2015 Narasimha ........... G06V 10/774
                                                     382/103
(Continued)

FOREIGN PATENT DOCUMENTS

CN        111084603 A      5/2020

OTHER PUBLICATIONS

Response with Amended Specification and Claims to European Office Action dated May 22, 2025 for European Application No. 23821814.3; Response filed on Nov. 20, 2025; 21 Pages.
PCT International Preliminary Report on Patentability dated May 22, 2025 for International Application No. PCT/US2023/079042; 10 Pages.
International Search Report and Written Opinion dated Mar. 13, 2024, for International Application No. PCT/US2023/079042; 14 pages.

*Primary Examiner* — Tat C Chio
(74) *Attorney, Agent, or Firm* — Daly, Crowley, Mofford & Durkee, LLP

(57) ABSTRACT

Systems, methods, and software are described which enable robust measurement of distances between 3D points, such as for pupillary distance (PD) of a wearer of corrective lenses that are known to be coplanar from a color-and-depth camera, e.g., a red-green-blue-depth (RGB-D) camera. Examples can provide a late fusion pipeline that first detects and tracks 2D landmarks in color imagery, projects those detections (detected 2D landmarks) into the depth frame, and discards measurements that appear noncoplanar and nonparallel. A user can be directed to change poses to precisely correct for nonparallel camera poses. Temporal filters can be used for the resulting distance measurements.

42 Claims, 8 Drawing Sheets

(51) Int. Cl.
  *G06V 40/16* (2022.01)
  *H04N 23/84* (2023.01)
  *H04N 23/951* (2023.01)

(52) U.S. Cl.
  CPC .......... *G06V 40/167* (2022.01); *G06V 40/168* (2022.01); *H04N 23/84* (2023.01); *H04N 23/951* (2023.01)

(58) Field of Classification Search
  CPC ...... G06V 40/167; G06V 40/168; G06T 7/75; G06T 2207/10024; G06T 2207/10028; G06T 2207/20084; G06T 2207/30201; G06T 7/60
  See application file for complete search history.

(56) References Cited

U.S. PATENT DOCUMENTS

| 2019/0294868 A1* | 9/2019 | Martinez | G06V 40/171 |
| 2022/0156485 A1* | 5/2022 | Tzvieli | H04N 23/951 |
| 2022/0182598 A1* | 6/2022 | Tadi | G06F 3/016 |
| 2022/0404578 A1* | 12/2022 | Lee | G06T 7/50 |

* cited by examiner

300A

Projection of landmarks from
camera frame to depth frame

Landmark detection on 2d imagery

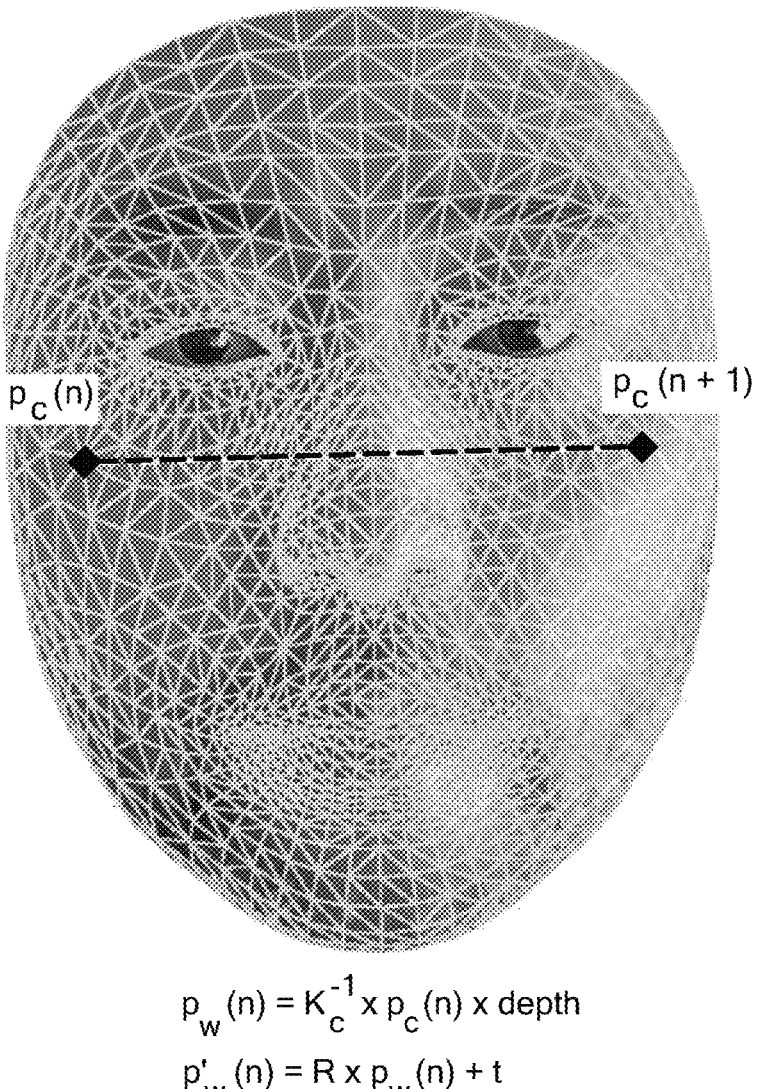

$$p_w(n) = K_c^{-1} \times p_c(n) \times depth$$

$$p'_w(n) = R \times p_w(n) + t$$

$$p_d(n) = K_d \times p'_w(n)$$

$(p_c(n))$ = Point in the color image in homogeneous coordinates $(K_c)$ = Intrinsic matrix of the color camera.

$(K_d)$ = Intrinsic matrix of the depth camera.

$([R|t])$ = Extrinsics relating the color camera to the depth camera.

*FIG. 3A*

Projection of landmarks from
camera frame to depth frame ~ 300B $$p_w(n) = K_c^{-1} \times p_c(n) \times depth$$

$$p'_w(n) = R \times p_w(n) + t$$

$$p_d(n) = K_d \times p'_w(n)$$

$(p_c(n))$ = Point in the color image in homogeneous coordinates $(K_c)$ = Intrinsic matrix of the color camera.

$(K_d)$ = Intrinsic matrix of the depth camera.

$([R|t])$ = Extrinsics relating the color camera to the depth camera.

$$R = I + \sin(\theta)K + (1 - \cos(\theta))K^2$$

face pose to achieve
co=planar requirement user is directed to move face so that pose matches co-planar requirement Face pose vs co-planar requirement pose plane parallel to sensor plane

500

METHOD AND SYSTEM FOR MEASURING COPLANAR POINT DISTANCES USING AN RGB-D CAMERA

RELATED APPLICATION

This application claims priority to and benefit of U.S. Provisional Patent Application No. 63/382,737, filed Nov. 8, 2022, and entitled "Method and System for Measuring Coplanar Point Distances Using an RGB-D Camera," the entire content of which is incorporated herein by reference.

STATEMENT REGARDING FEDERALLY SPONSORED RESEARCH

This invention was made with government support under contract number W911SR-19-C-0046 awarded by the U.S. Army. The government has certain rights in the invention.

BACKGROUND

Prescribing a pair of corrective lenses typically requires knowledge of the wearer's pupillary distance (PD), the distance between the centers of the wearer's pupils. This measurement is a major bottleneck for online retailers who sell direct to consumers, especially for consumers who need strong prescriptions that require clinically accurate PD measurements. The introduction of smartphones with integrated depth cameras, such as the Apple iPhone X, has enabled more accurate at-home measurement, but their raw depth measurements are still sufficiently noisy to limit their clinical use.

The demand for accurate pupillary distance (PD) measurements has been a longstanding challenge for online eyewear retailers as accurate PD measurements are typically vital for the efficacy of prescribed lenses. This challenge can be particularly significant for consumers who have relatively strong eye prescriptions.

The advent of smartphones equipped with depth cameras, exemplified by models such as the Apple iPhone X, has offered potential solutions for at-home measurements. However, the inherent noise in raw depth measurements from such devices restricts their clinical applicability.

For example, the following contemporary depth-enabled solutions have presented significant limitations:

(1) Early fusion approach: Directly fits a 3D model to the RGB-D image, and computes distances based on the model landmarks. This technique has been shown to be prone to underfitting.

(2) Late fusion approach: Measures 2D landmark distances post-projection into the depth frame, devoid of any coplanarity constraints, is prone to sensor and 3D pose estimation noise.

SUMMARY

An aspect of the present disclosure includes systems, methods, and software (e.g., including a software application/solution running on one or more processors) that enable robust measurement of distances between 3D points that are known to be coplanar from a color-and-depth camera, e.g., a red-green-blue-depth (RGB-D) camera. Examples can provide a late fusion pipeline that first detects and tracks 2D landmarks in color imagery, projects those detections (detected 2D landmarks) into the depth frame, discards measurements that appear noncoplanar and nonparallel, directs the user to precisely correct for nonparallel camera poses, and temporally filters the resulting distance measurements.

One general aspect of the present disclosure is directed to and includes a system for measuring coplanar point distances of facial features using an RGB-D camera. The system can include an RGB-D camera having an RGB camera and a depth (D) camera, where the RGB camera includes an RGB sensor and is configured to produce output signals on an RGB channel corresponding to one or more RGB images, and where the depth camera includes a depth sensor and is configured to produce output signals on a depth channel corresponding to one or more depth images; a memory including computer-executable instructions; and a processor coupled to the memory and operative to execute the computer-executable instructions, the computer-executable instructions causing the processor to perform operations including: using a landmark detector to detect one or more pairs of coplanar points as landmark pairs in one or more color images of a user's face captured by the RGB-D camera, where each landmark pair corresponds to symmetrical facial features of the user, respectively; fusing color and depth channels corresponding to the RGB camera and the depth camera of the RGB-D camera, respectively, by using corresponding camera projection matrices and extrinsic parameters to project the detected landmarks pairs from the one or more color images into corresponding one or more depth images, where the camera projection matrices define camera lens and sensor intrinsic parameters, and where the extrinsic parameters describe a transformation between the color and depth sensors; enforcing coplanarity and parallelity of the detected landmarks pairs; flattening the landmark pairs such that each landmark in the pair shares the depth value of the perceived nearest landmark to the camera for mitigating potentially noisy depth sensor measurements; projecting each landmark into world coordinates using the intrinsic parameters of the depth sensor, where the intrinsic parameters include the optical center and focal length of the depth camera; and calculating a point distance between the points of one landmark pair in the world coordinates of the depth sensor. Other embodiments of this aspect include corresponding computer systems, apparatus, and computer programs recorded on one or more computer storage devices, each configured to perform the actions of the methods.

Implementations may include one or more of the following features. The calculated point distance may include a pupillary distance. The processor may be further configured to use a coarse object pose estimator to constrain the rotation angle of the camera relative to the user. The one or more images may include a plurality of frames of video from the RGB-D camera. Fusing the color and depth channels further may include synchronizing the color and depth channels. Using the landmark detector may include using a convolutional neural network. Using the landmark detector may include using a deep landmark detection network. Using the landmark detector may include edge detection. Using the landmark detector may include using an optical flow algorithm. Using the landmark detector may include using a facial landmark detection model. Using the landmark detector may include using SIFT (algorithm) or SURF (algorithm) as a feature-based methodology. The processor can be configured to calculate the distance between the points using the Cartesian distance formula. The processor can be further configured to apply a temporal filter to successive values of the calculated point distance between the points. The processor can be further configured to incorporate a vergence adjustment into the calculated distance, where the two points correspond to pupils of a user, and where the calculated distance may include an interpupillary distance (IPD).

Another general aspect of the present disclosure is directed to and includes a method of using an RGB-D camera for measuring coplanar point distances of facial features. The method can include using a landmark detector to detect one or more pairs of coplanar points as landmark pairs in one or more color images of a user's face captured by the RGB-D camera, where each landmark pair corresponds to symmetrical facial features of the user, respectively; fusing color and depth channels corresponding to the RGB camera and the depth camera of the RGB-D camera, respectively, by using corresponding camera projection matrices and extrinsic parameters to project the detected landmarks pairs from the one or more color images into corresponding one or more depth images, where the camera projection matrices define camera lens and sensor intrinsic parameters, and where the extrinsic parameters describe a transformation between the color and depth sensors; enforcing coplanarity and parallelity of the detected landmarks pairs; flattening the landmark pairs such that each landmark in the pair shares the depth value of the perceived nearest landmark to the camera for mitigating potentially noisy depth sensor measurements; projecting each landmark into world coordinates using the intrinsic parameters of the depth sensor, where the intrinsic parameters include the optical center and focal length of the depth camera; and calculating a point distance between the points of one landmark pair in the world coordinates of the depth sensor. Other embodiments of this aspect include corresponding computer systems, apparatus, and computer programs recorded on one or more computer storage devices, each configured to perform the actions of the methods.

Implementations may include one or more of the following features. The calculated point distance may include a pupillary distance. The processor can be further configured to use a coarse object pose estimator to constrain the rotation angle of the camera relative to the user. The one or more images may include a plurality of frames of video from the RGB-D camera. Fusing the color and depth channels further may include synchronizing the color and depth channels. Using the landmark detector may include using a convolutional neural network. Using the landmark detector may include using a deep landmark detection network. Using the landmark detector may include edge detection. Using the landmark detector may include using an optical flow algorithm. Using the landmark detector may include using a facial landmark detection model. Using the landmark detector may include using sift or surf as a feature-based methodology. The processor can be configured to calculate the distance between the points using the cartesian distance formula. The processor can be further configured to apply a temporal filter to successive values of the calculated point distance between the points. The processor can be further configured to incorporate a vergence adjustment into the calculated distance, where the two points correspond to pupils of a user, and where the calculated distance may include an interpupillary distance (IPD). Implementations of the described techniques may include hardware, a method or process, or computer software on a computer-accessible medium.

A further general aspect of the present disclosure is directed to and includes a computer readable storage medium including computer executable instructions for measuring coplanar point distances of facial features using an RGB-D camera. The computer readable storage medium also includes instructions for using a landmark detector to detect one or more pairs of coplanar points as landmark pairs in one or more color images of a user's face captured by the RGB-D camera, where the RGB-D camera includes an RGB camera and a depth (D) camera, and where each landmark pair corresponds to symmetrical facial features of the user, respectively; fusing color and depth channels corresponding to the RGB camera and the depth camera of the RGB-D camera, respectively, by using corresponding camera projection matrices and extrinsic parameters to project the detected landmarks pairs from the one or more color images into corresponding one or more depth images, where the camera projection matrices define camera lens and sensor intrinsic parameters, and where the extrinsic parameters describe a transformation between the color and depth sensors; enforcing coplanarity and parallelity of the detected landmarks pairs; flattening the landmark pairs such that each landmark in the pair shares the depth value of the perceived nearest landmark to the camera for mitigating potentially noisy depth sensor measurements; projecting each landmark into world coordinates using the intrinsic parameters of the depth sensor, where the intrinsic parameters include the optical center and focal length of the depth camera; and calculating a point distance between the points of one landmark pair in the world coordinates of the depth sensor. Other embodiments of this aspect include corresponding computer systems, apparatus, and computer programs recorded on one or more computer storage devices, each configured to perform the actions of the methods.

Implementations may include one or more of the following features. The storage medium can include instructions providing that the calculated point distance may include a pupillary distance. The processor can be further configured to use (as provided by computer readable instructions in the storage medium) a coarse object pose estimator to constrain the rotation angle of the camera relative to the user. The one or more images may include a plurality of frames of video from the RGB-D camera. Fusing the color and depth channels further may include synchronizing the color and depth channels. Using the landmark detector may include using a convolutional neural network. Using the landmark detector may include using a deep landmark detection network. Using the landmark detector may include edge detection. Using the landmark detector may include using an optical flow algorithm. Using the landmark detector may include using a facial landmark detection model. Using the landmark detector may include using sift or surf as a feature-based methodology. The processor can be configured (with computer readable instructions) to calculate the distance between the points using the cartesian distance formula. The processor can be further configured (with computer readable instructions) to apply a temporal filter to successive values of the calculated point distance between the points. The processor is further configured to incorporate a vergence adjustment into the calculated distance, where the two points correspond to pupils of a user, and where the calculated distance may include an interpupillary distance (IPD).

Embodiments of the aspects and examples described may include corresponding computer systems, apparatus, and computer programs recorded on one or more computer storage devices or memory (including memory chip packages and/or memory devices), each configured to perform the actions of the methods as described herein. A computer system of one or more computers can be configured to perform particular operations or actions, as described herein, by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The features and advantages described herein are not all-inclusive; many additional features and advantages will be apparent to one of ordinary skill in the art in view of the drawings, specification, and claims. Moreover, it should be noted that the language used in the specification has been selected principally for readability and instructional purposes, and not to limit in any way the scope of the present disclosure, which is susceptible of many embodiments. What follows is illustrative, but not exhaustive, of the scope of the present disclosure.

BRIEF DESCRIPTION OF THE DRAWINGS

The manner and process of making and using the disclosed embodiments may be appreciated by reference to the figures of the accompanying drawings. It should be appreciated that the components and structures illustrated in the figures are not necessarily to scale, emphasis instead being placed upon illustrating the principals of the concepts described herein. Furthermore, embodiments are illustrated by way of example and not limitation in the figures, in which:

FIGS. 3A-3B show an example of projection of landmarks from a camera frame to a depth frame, in accordance with the present disclosure;

DETAILED DESCRIPTION

The features and advantages described herein are not all-inclusive; many additional features and advantages will be apparent to one of ordinary skill in the art in view of the drawings, specification, and claims. Moreover, it should be noted that the language used in the specification has been selected principally for readability and instructional purposes, and not to limit in any way the scope of the inventive subject matter. The subject technology is susceptible of many embodiments. What follows is illustrative, but not exhaustive, of the scope of the subject technology.

Aspects of the present disclosure are directed to and include systems, methods, including a software-based method (e.g., one or more software applications running on a suitable processor or processors) for accurately measuring distances, e.g., between two (2) or more 3D points that lie on the same plane, using an RGB-D camera.

Examples and embodiments of the present disclosure provide a software approach designed explicitly for enhancing the precision of distance calculations between 3D landmarks located on a common plane, utilizing the functionalities of an RGB-D camera system. This methodology overcomes the challenges and inaccuracies previously encountered in similar technologies, addressing the crucial need for reliable measurements in 3D space.

Summary of algorithms used for example embodiments:

A. A landmark detector identifies (and can track, in some embodiments) coplanar points in one or more images (e.g., across sequential video frames) of a target object, e.g., a user's face) from the RGB-D camera. For facial measurements, facial landmark detectors can target symmetric facial features like the contours and/or pupils of both eyes.

B. Users are instructed to align the camera sensor parallel to the measurement plane. A coarse object pose estimator can be used for regulation of the camera's rotation angle concerning the object. Misalignment (e.g., beyond a given threshold level) can produce prompts for user adjustments of the camera to achieve a desired degree of parallelity (parallelism).

C. Late fusion is employed in the pipeline to synchronize and merge color and depth channels. Utilizing camera projection matrices alongside known extrinsics, landmark detections from the color imagery are projected into the depth frame.

D. Coplanarity and parallelity enforcement can be done by computing depth differences for every coplanar point pair. Any value exceeding a pre-determined threshold (based on sensor noise characteristics) can be discarded. If constant threshold breaches are detected, users can receive instructions for device rotation to attain parallelism.

Through the depth sensor's known intrinsics, each landmark can be converted into world coordinates, followed by the calculation of the metric distance between points. These distances can undergo temporal filtration, for example, using an exponential moving average.

Figure 1:
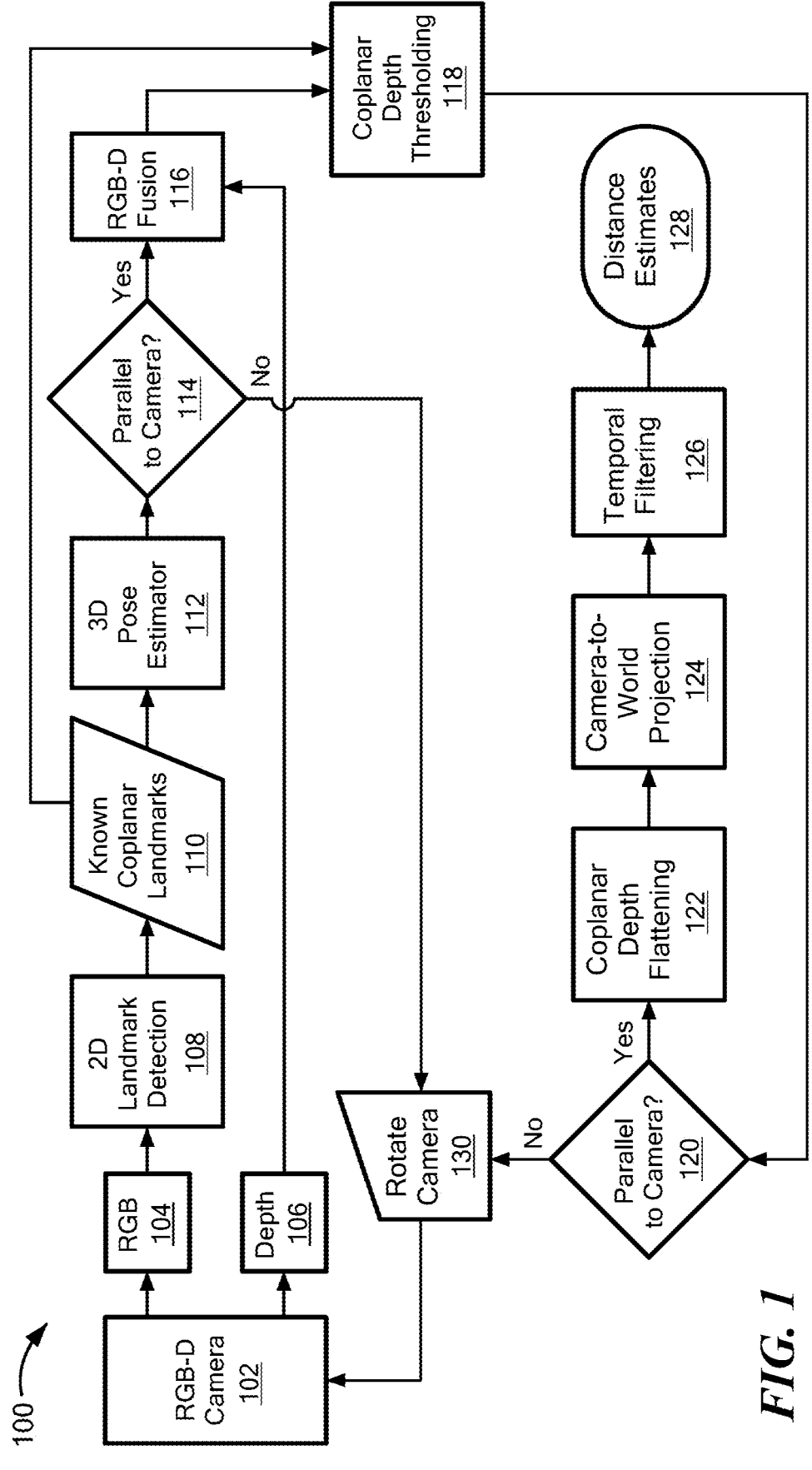
FIG. 1 is a diagram showing an example method for measuring coplanar point distances using an RGB-D camera, in accordance with the present disclosure.

FIG. 1 is a diagram showing an example method 100 for measuring coplanar point distances using an RGB-D camera, in accordance with the present disclosure. The method 100 can provide robust measurement of distances between 3D points (e.g., including but not limited to, points defining pupillary distance (PD) of a wearer of corrective lenses) that are known to be coplanar from a color-and-depth camera, e.g., a red-green-blue-depth (RGB-D) camera 102 having RGB sensor 104 (e.g., an RGB photodetector array) and depth sensor 106 (e.g., a LIDAR sensor having an infrared array with time-of-flight timing detection/functionality).

A landmark detector 108 can be first used to identify and track coplanar points 108 across multiple frames of video captured by RGB-D camera 102. For the purpose of facial measurement, for example, a facial landmark detector 108 can be used to identify symmetric facial features that are mostly coplanar, such as left and right eye contours. A coarse object pose estimator 112 can be used to constrain the rotation angle of the camera relative to the measurement object (e.g., a region of a person's face including eyes and nose).

The method 100 can instruct a user to position the camera sensor, so that it is parallel (or essentially parallel) to the plane of measurement. A check can be made 114 to determine whether the camera's sensor (or grouping of RGB-D sensors), e.g., in the focal plane are parallel to the plane of measurement; the user can be directed to rotate the camera (shown at 130) if out of alignment. Color and depth channels can be synchronized and fused 116 as shown, relatively late in the pipeline (data flow).

The corresponding camera projection matrices and the known "extrinsics," describing the transformation between color (e.g., RGB) and depth (D) sensors, can be used to project landmark detections from the color image into the depth image. The term "extrinsics," a.k.a., "extrinsic parameters," can be considered to include extrinsic parameters representing the transformation (i.e., the rotation and translation) between the 6D poses of the RGB and Depth sensors.

To enforce (or facilitate enforcement of) the coplanarity and parallelity of the measured landmarks, the difference between the depths of each pair of coplanar points is calculated and compared to a threshold, a.k.a., thresholded, (shown by coplanar depth thresholding 118) such that all values above the threshold are discarded. A threshold value can be chosen/selected per sensor and may depend on the noise characteristics of a particular sensor. If the method 100 (or software or a system implementing method 100) detects consistent differences above threshold (e.g., for a parallelity check of the measured landmarks in relation to the camera's pose, as shown at 120) it can direct the user to rotate the device accordingly to achieve parallelism, as shown at 130. This mechanism enables fine-scale adjustment of the camera's pose relative to the plane of measurement even when pose estimation is noisy and coarse. To mitigate potentially noisy depth sensor measurements, coplanar landmark sets are flattened (shown at 122) such that each landmark in the set shares the depth value of the perceived nearest landmark to the camera. Each landmark can then be projected into world coordinates (shown at 124) using the depth sensor's known "intrinsics" (referring to intrinsic parameters representing the optical center, focal length, and distortions of the camera, including its lens and sensor components/system) and the distance (e.g., metric distance) between the points is calculated 128. Distances can be filtered temporally (shown at 126), for example, using an exponential moving average.

In some examples, to maximize the accuracy of the depth camera and achieve clinical accuracy, it may be desirable then to precisely constrain the viewpoint of the capture and filter the raw outputs accordingly based on assumptions made about the configuration of the measurement landmarks.

Exemplary Embodiments

Features and details of various exemplary embodiments are provided below. Of course, other features and details may be used or practiced within the scope of the present disclosure instead of or in addition to those described.
Landmark Detection:

As shown and described for FIG. 1, embodiments of the present disclosure can utilize landmark detection for measuring metric distances with an RGB-D camera, e.g., for PD measurements.

Figure 2:
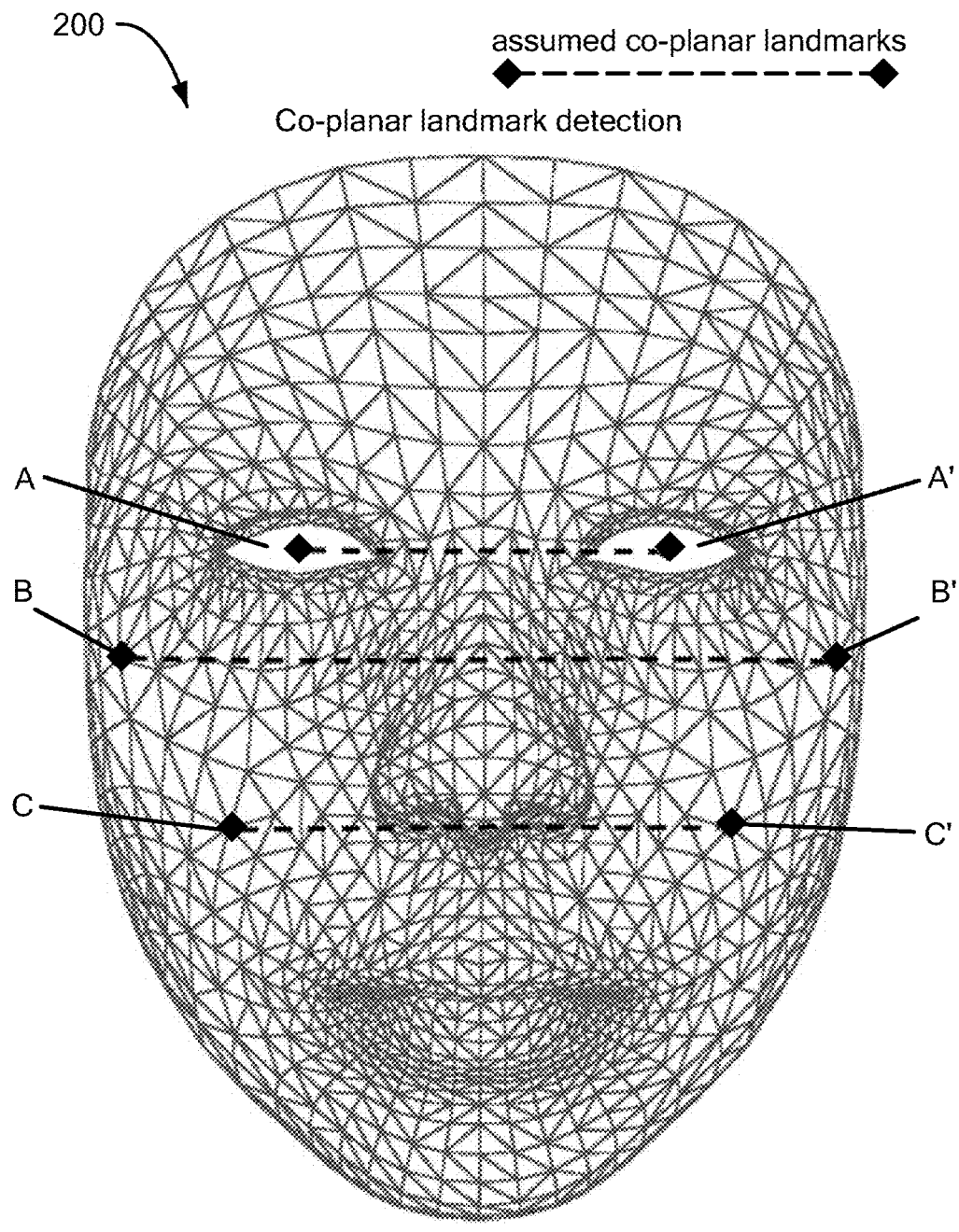
FIG. 2 is an example mesh representation of a user's face as used for co-planar landmark detection, in accordance with the present disclosure.

FIG. 2 is an example mesh representation 200 of a user's face use as used for co-planar landmark detection, in accordance with the present disclosure. Sets of landmarks A-A', B-B', and C-C' are shown.

For landmark detection and tracking, e.g., within RGB video frames, a variety of methodologies are contemplated for example embodiments within the scope of the present disclosure. The methodologies can include, but are not limited to, deep learning techniques exemplified by Convolutional Neural Networks (CNNs) and/or specialized Deep Landmark Detection Networks. In some embodiments, when a system (e.g., a smartphone with RGB-D camera and software implementing method 100 of FIG. 1 or a similar method according to the present disclosure) narrows its focus towards facial measurements, it employs specialized detectors aimed at symmetric facial attributes.

Such techniques can encompass edge detection methodologies like the Sobel or Canny filters, optical flow paradigms such as the Lucas-Kanade or Farneback algorithms, and facial landmark detection protocols including Haar cascades, Dlib models, Active Shape Models (ASM), Active Appearance Models (AAM), and feature-based methodologies such as SIFT or SURF. It should be understood that the aforementioned techniques serve as illustrative examples and the scope of the present disclosure and/or subject technology is not confined or limited to these specific methods/techniques/protocols; others may be used within the scope of the present disclosure.
Late Fusion:

The step of late fusion (e.g., as described for method 100 at step 116) can involve precise projection of 2D landmark detections from the color imagery (image) into the corresponding positions within the depth frame. To achieve this, a system (e.g., a smartphone with RGB-D camera and software implementing method 100 of FIG. 1 or a similar method according to the present disclosure) can employ camera projection matrices. These matrices can capture the intrinsic properties/parameters of the camera lens and sensor (e.g., RGB and D sensors), e.g., the optical center, focal length, and distortions of the camera, including its lens and sensor system. When combined with the known extrinsics, which define the camera's position and orientation in space, the landmark detections can be accurately mapped from the color images onto their respective positions in the depth frame. This fusion can ensure that the landmarks, once identified in the color imagery, are accurately represented in a three-dimensional space, capturing their depth and spatial relationships effectively.

Figure 3B:
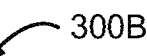
Figure 3B:
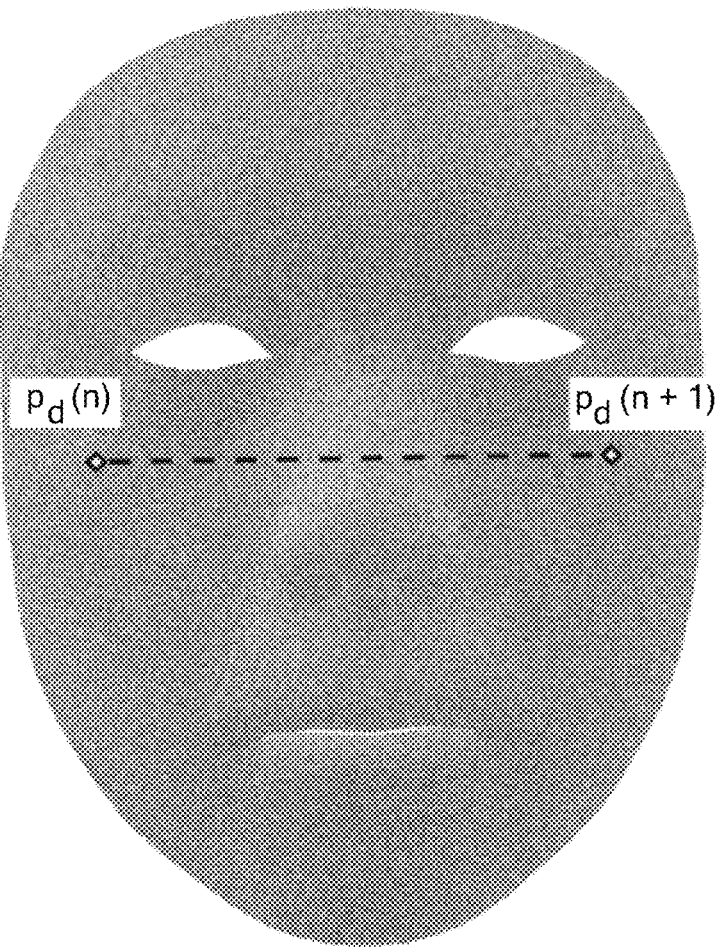

FIGS. 3A-3B show an example 300 of projection of landmarks from an RGB camera frame to a depth frame, in accordance with the present disclosure.

The following equations describe the projection of landmarks from color imagery to their respective positions in the depth frame, ensuring their accurate representation in 3D space, in accordance with example embodiments of the present disclosure.

Defined Equation Terms for Example Embodiments

1. $(p_c(n))$=Point in the color image in homogeneous coordinates (typically a 3×1 vector with the format [x, y, 1]$^T$).
2. $(K_c)$=Intrinsic matrix of the color camera.
3. $(K_d)$=Intrinsic matrix of the depth camera.
4. $([R|t])$=Extrinsics relating the color camera to the depth camera. Here, $(R)$ is the rotation matrix, and $(t)$ is the translation vector.

First, the point is found (located) in the world coordinates using the color camera's $$p_w(n) = K_c^{-1} \times p_c(n) \times \text{depth}_c \qquad \text{(EQ. 1)}$$

where $(\text{depth}_c)$ is the depth of the point $(p_c)$ in the color frame (if available). If this depth is not available, the point cannot be projected accurately.

Next, this world point can be transformed to the depth camera's coordinate system:

$$p'_w(n) = R \times p_w(n) + t \qquad \text{(EQ. 2)}$$

Now, this point can be projected onto the depth camera's image plane:

$$p_d(n) = K_d \times p_w'(n) \qquad \text{(EQ. 3)}$$

The point $(p_d(n))$ is the projection of $(p_c(n))$ into the depth frame.

Camera Alignment Guidance:

Precise measurement can be facilitated by proper camera alignment. Using the output from the coarse object pose estimator, a system (e.g., a smartphone with RGB-D camera and software implementing method 100 of FIG. 1 or a similar method according to the present disclosure) continuously checks the orientation of the RGB-D camera against the detected plane of the face. The Rodrigues' rotation formula can be applied to compute the rotation vector:

$$R = I + \sin(\theta)K + (1 - \cos(\theta))K^2 \qquad \text{(EQ. 4)}$$

where $(K)$ is the cross-product skew-symmetric matrix of the rotation axis, and $(\theta)$ is the rotation angle. When the angle deviates from the optimal, the user interface (which can be designed with intuitive graphics) can provide visual cues pointing in the direction of required adjustment. Additionally, or alternatively, in some embodiments, an auditory beep frequency can be used and altered (e.g., caused to increase) as the camera gets closer to the ideal alignment, offering another feedback dimension.

Practitioners have the option to employ direct axis-specific thresholds. This means that each axis (X, Y, Z) can have its unique threshold value(s), allowing for fine-tuned alignment checks. For instance, while the X-axis may permit a slight rotation without significant measurement deviation, the Y-axis might be more sensitive and demand stricter alignment. Users can set these thresholds based on their specific requirements or the characteristics of the object being analyzed. As in the vector-based approach, when the system identifies a misalignment beyond the set thresholds, it can prompt (e.g., using an auditory, haptic, and/or visual prompt) a user to take corrective action(s).

Figure 5:
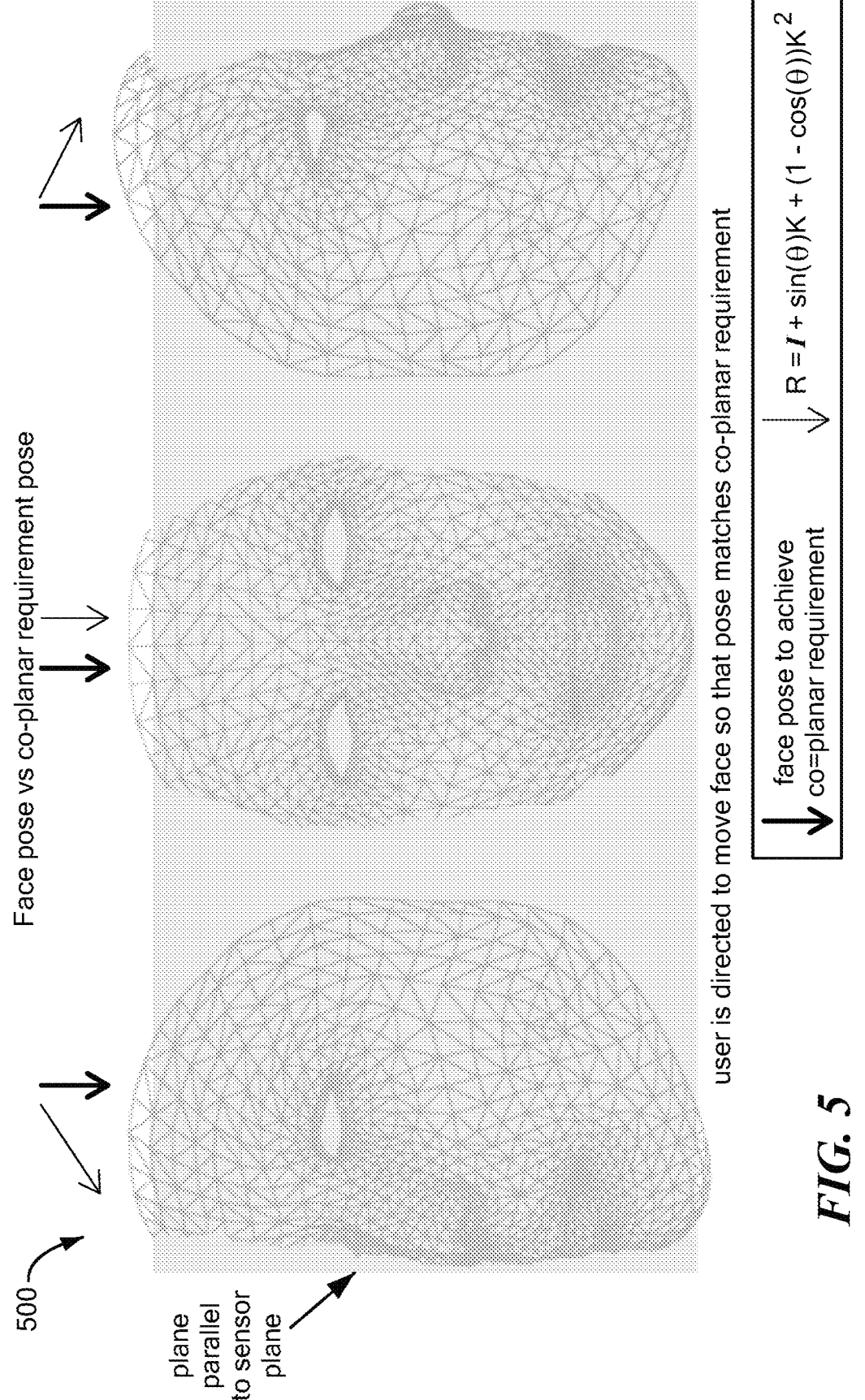
FIG. 5 is a diagram showing an example user guidance for face pose positioning to match the co-planar requirement, in accordance with the present disclosure.

FIG. 5 shows an example user guidance 500 for face pose positioning to match co-planar requirement, in accordance with the present disclosure.

Figure 4A:
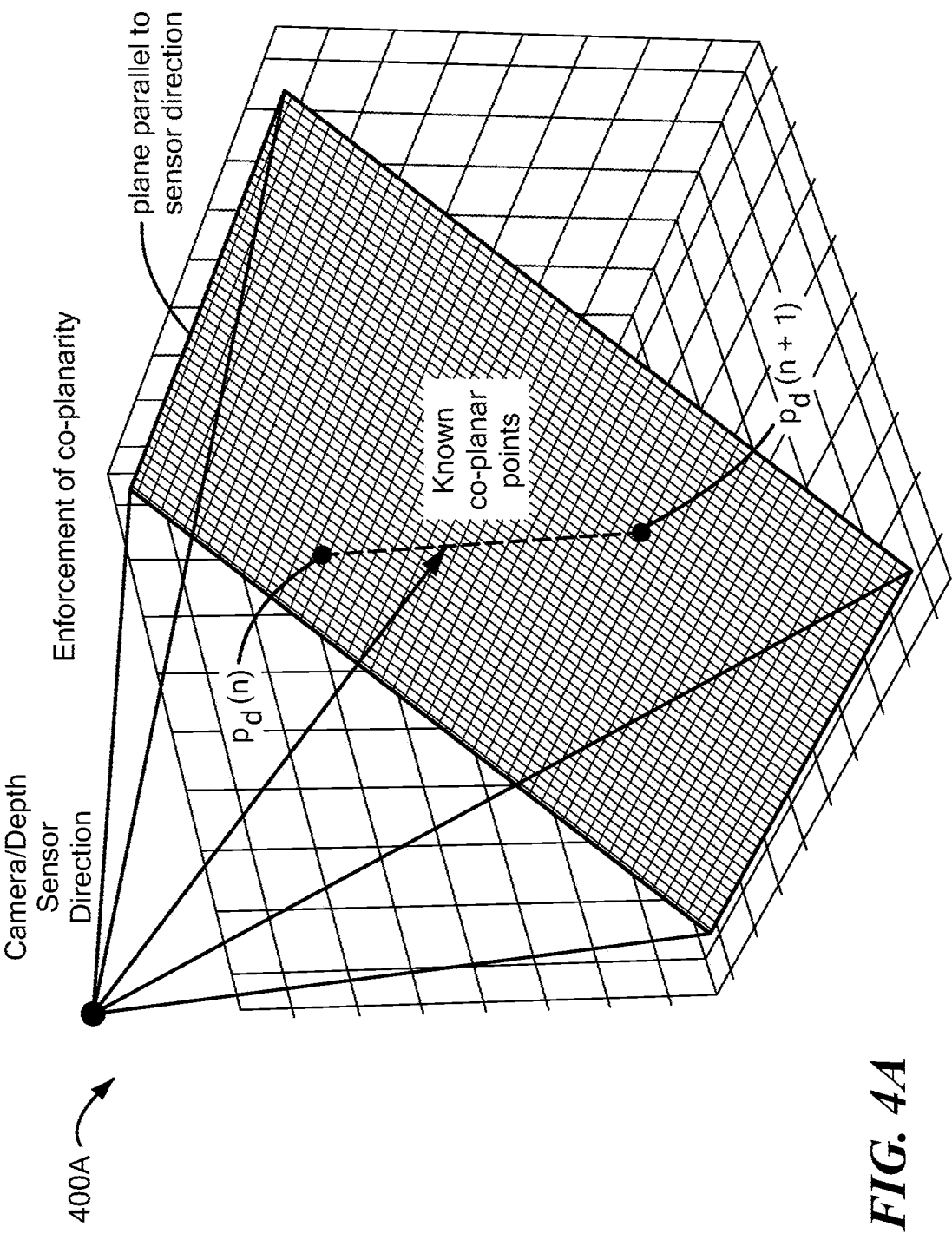
FIGS. 4A-4B show perspective and side views, respectively, of enforcement of coplanarity, in accordance with the present disclosure.
Figure 4B:
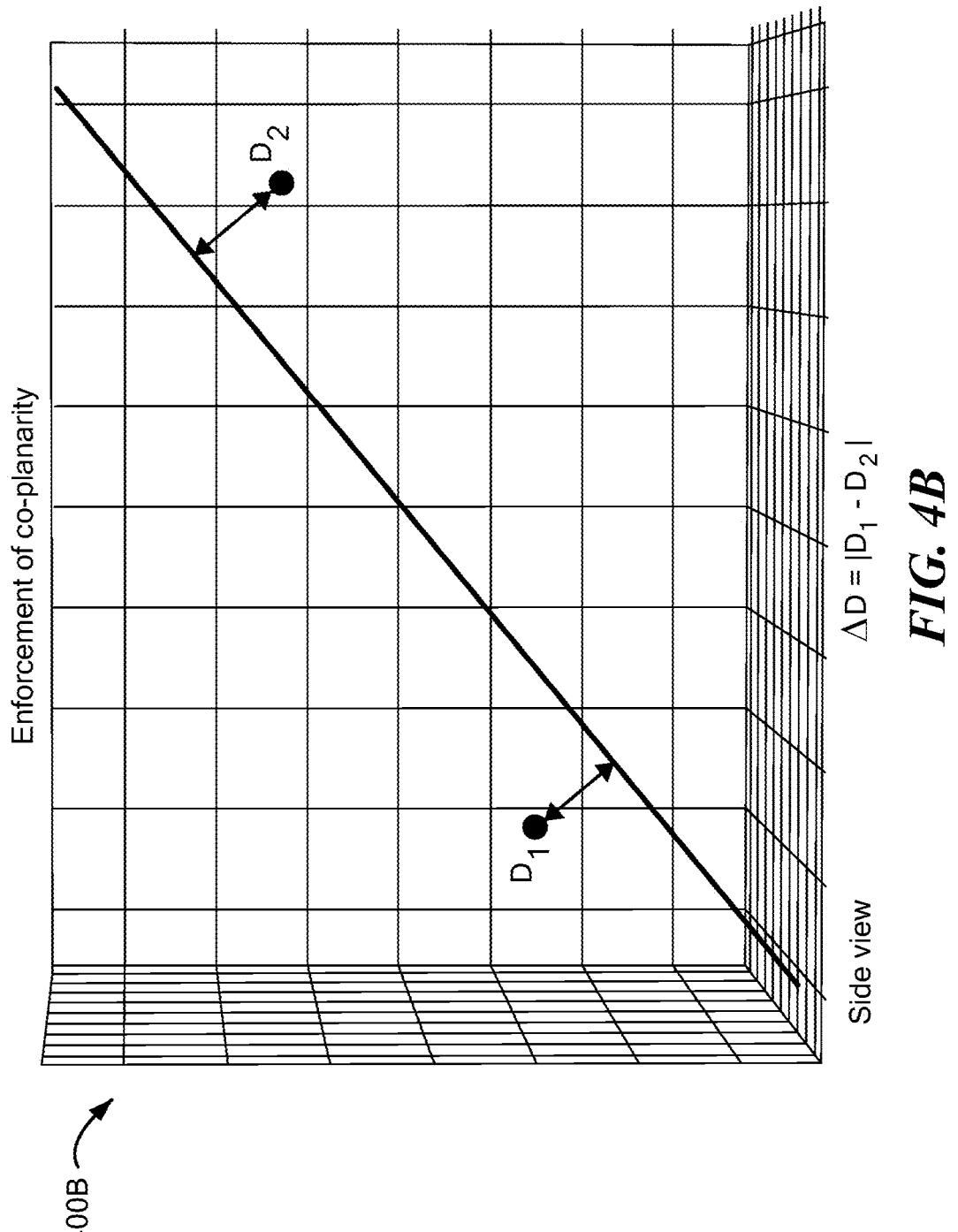

Enforcement of Coplanarity:

FIGS. 4A-4B show perspective and side views, respectively, of enforcement of coplanarity 400, in accordance with the present disclosure.

To best ensure that detected landmarks remain coplanar, their depth differences can be (and, in some embodiments, preferably are) constantly checked. Given two points $(P_1)$ and $(P_2)$ with depths $(D_1)$ and $(D_2)$, the depth difference $(\Delta D = |D_1 - D_2|)$ is computed. If $(\Delta D > T)$, where $(T)$ is a predetermined threshold, the reading is considered an anomaly. This threshold $(T)$ can be derived from empirical tests conducted on the noise characteristics of the sensor, sometimes computed as the standard deviation of background noise. In some embodiments, continuous anomalies can trigger user prompts, suggesting alignment corrections or sensor issues.

$$\Delta D = |D_1 - D_2| \qquad \text{(EQ. 5)}$$

Depth flattening can be introduced to further enhance the accuracy of measurements, particularly when confronting known sensor biases. In scenarios where the depth camera exhibits a noticeable rightward bias, the system (e.g., a smartphone with RGB-D camera and software implementing method 100 of FIG. 1 or a similar method according to the present disclosure) can opt for a straightforward corrective approach: should the depth difference exceed the threshold, the depth of the left point $(D_1)$ is adopted for both points, essentially "flattening" the depth values to maintain coplanarity.

Unlike many systems that simply detect points and compute distances without ensuring their planarity, techniques (methods, systems, algorithms, etc.) according to the present disclosure can verify that these landmarks are indeed coplanar before any further processing or computation. This can ensure constancy and/or reliability. Regarding consistency, all detected landmarks can be rendered consistent in depth, leading to more accurate spatial measurements, especially when analyzing flat or predominantly flat surfaces. Regarding reliability, by ensuring coplanarity, errors (which can arise when measuring distances between landmarks that are not on the same plane) are inherently minimized.

Transformation to Word Coordinates and Distance Calculation:

Landmarks can be transformed (caused to undergo a transformation or mapping) to global coordinates (e.g., as indicated at step 124 in FIG. 1) using the depth sensor's intrinsic matrix. The transformation can be performed after accurate detection and alignment. The following provides an example of such a transformation.

Given a point $(P)$ in image coordinates, its world coordinates $(P')$ can be computed as $(P' = K^{-1} * P * D)$, where $(K)$ is the intrinsic matrix. Subsequently, the Euclidean distance formula, $(d = \sqrt{(x_2 - x_1)^2 + (y_2 - y_1)^2 + (z_2 - z_1)^2})$, can be employed to compute distances between landmarks in world coordinates. To counteract transient noise, a temporal filtration using an exponential moving average can be applied: $(S_t = \alpha * Y_t + (1 - \alpha) * S_{t-1})$, where $(Y_t)$ is the current reading, $(S_t)$ is the smoothed value, and $(\alpha)$ is a smoothing factor between 0 and 1.

For the special case of measuring inter-pupillary distance (IPD)(a.k.a., PD), it is preferable to adjust IPD based on the distance of the viewed object, stemming from the phenomenon of vergence. As the human eyes rotate to converge the gaze on an object, the IPD subtly shifts. Given the significance of precise IPD in ensuring optimal visual fidelity, a computational approach to adjust the IPD based on vergence angles can be advantageously used:

The average diameter of a human eye can be defined as follows (though other values may be used, e.g., based on statistics for a given population):

$$\text{AverageEyeDiameter} = 0.024 \text{ meters}$$

The vergence angle can be derived for distant gaze, given the distance to the eyes and the initial measured pupillary distance:

$$\text{VergenceAngle\_Inital} = \arctan\left(\frac{EyeDistance}{\frac{InitialPD}{2}}\right) \qquad \text{(EQ. 6)}$$

The pupillary distance can be adjusted for distant objects by computing the adjustment using the average eye diameter and the cosine of the distant vergence angle:

$$\text{PD\_Adjustment\_Far} = \text{AverageEyeDiameter} \times \cos(\text{VergenceAngle\_Initial}) \qquad \text{(EQ. 7)}$$

$$\text{PD\_Far} = \text{InitialPD} + \text{PD\_Adjustment\_Far} \qquad \text{(EQ. 8)}$$

For near objects, e.g., targeting an object positioned 0.3 meters away, the vergence angle can be calculated (using that distance or an estimate of that distance):

$$VergenceAngle\_Near = \arctan\left(\frac{0.3}{\frac{PD\_Far}{2}}\right) \qquad \text{(EQ. 9)}$$

The pupillary distance for near objects can be adjusted using the formula:

$$PD\_Adjustment\_Near = \qquad \text{(EQ. 10)}$$
$$\left(\frac{AverageEyeDiameter}{2}\right) \times \cos(VergenceAngle\_Near) \times 2$$

$$PD\_Near = PD\_Far - PD\_Adjustment\_Near \qquad \text{(EQ. 11)}$$

Embodiments of the present disclosure may be implemented with or as suitable computer/computing devices.

Figure 6:
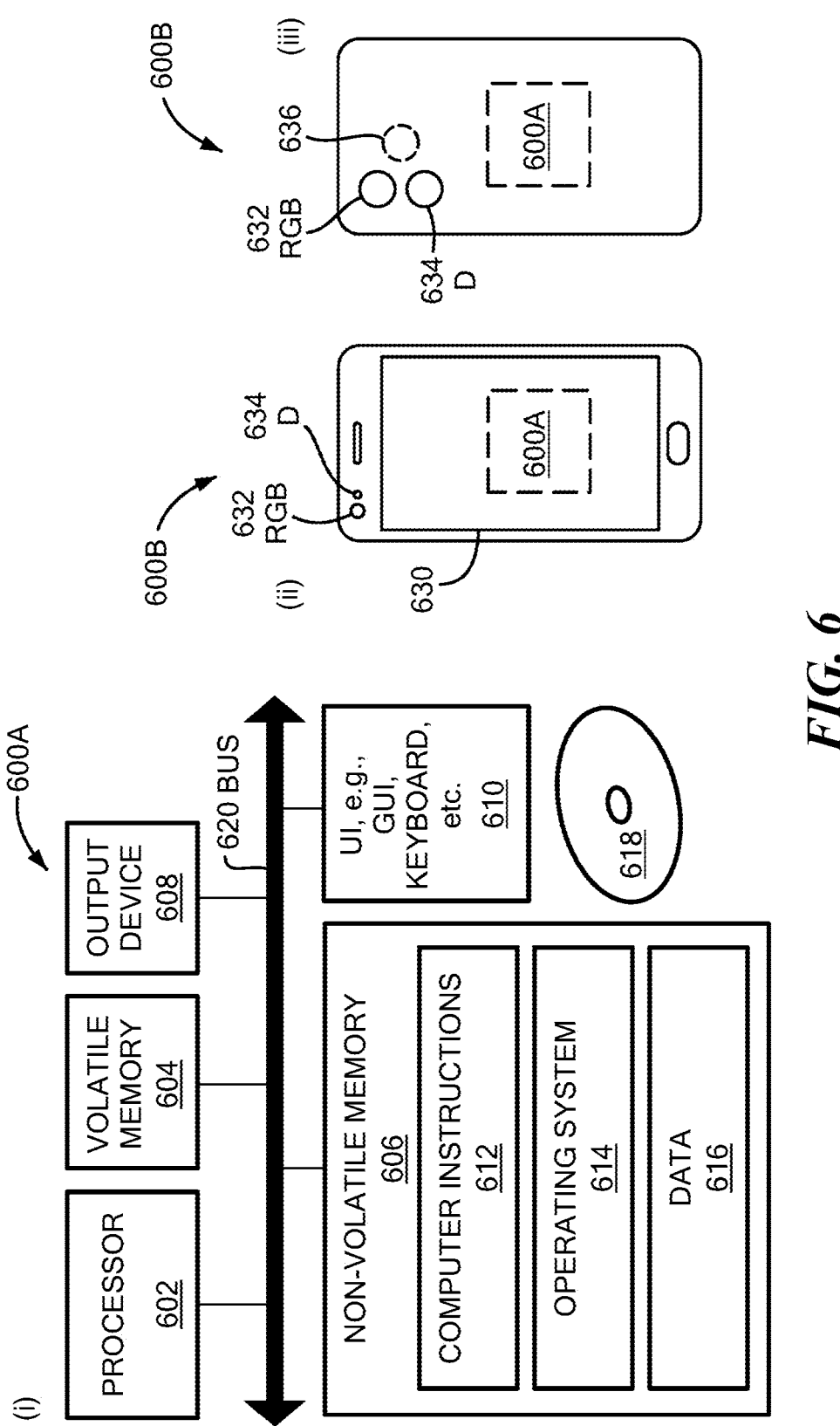
FIG. 6 is a block diagram showing examples of computer systems configured to perform processing, in accordance with the present disclosure.

FIG. 6 is a block diagram, with views (i)-(iii), of example computer/computing systems 600 (600A-600B) operative (configured) to perform processing in accordance with the present disclosure. Computer system 600 can perform all or at least a portion of the processing, e.g., steps in the algorithms, calculations, formulae, and methods described herein. View (i) shows system components of system 600A. Views (ii)-(iii) show example embodiments with system 600A implemented wireless cellular device 600B having an RGB-D camera, e.g., a smartphone with an RGB-D camera or separate RGB and D cameras.

The computer system 600 (600A, 600B) includes one or more processors 602, one or more volatile memories 604, one or more non-volatile memories 606 (e.g., hard disk or cache), one or more output devices/components 608, and one or more user input or interfaces (UI) 610, e.g., a graphical user interface (GUI), a mouse, a keyboard, a display, and/or a touchscreen, etc. The non-volatile memory (e.g., cache or other non-transitory storage medium) 606 stores computer instructions 612 (a.k.a., machine-readable instructions or computer-readable instructions) such as software (computer program product), and/or an operating system 614 and data 616. In some examples/embodiments, the computer instructions 612 can be executed by the processor(s) 602 out of volatile memory 604. In some examples/embodiments, an article 618 (e.g., a storage device or medium such as a hard disk, an optical disc, magnetic storage tape, optical storage tape, flash drive, cache RAM, etc.) includes or stores the non-transitory computer-readable instructions. Bus 620 is also shown.

Processing may be implemented in hardware, software, or a combination of the two. Processing may be implemented in computer programs (e.g., software applications) executed on programmable computers/machines that each includes a processor, a storage medium or other article of manufacture that is readable by the processor (including volatile and non-volatile memory and/or storage elements), and optionally at least one input device, and one or more output devices. Program code may be applied to data entered using an input device or input connection (e.g., a port or bus) to perform processing and to generate output information.

The system 600 (600A, 600B) can perform processing, at least in part, via a computer program product or software application, (e.g., in a machine-readable storage device), for execution by, or to control the operation of, data processing apparatus (e.g., a programmable processor, a computer, or multiple computers). Each such program may be implemented in a high-level procedural or object-oriented programming language to communicate with a computer system. The programs may be implemented in assembly or machine language. The language may be a compiled or an interpreted language and it may be deployed in any form, including as a stand-alone program or as a module, component, subroutine, or other unit suitable for use in a computing environment.

A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate. Further, the terms "computer" or "computer system" may include reference to plural like terms, unless expressly stated otherwise.

As shown in views (ii)-(iii), in some embodiments a cellular device or smartphone 600B can include system 600A (or can provide real time or near real time wireless access to functionality of system 600A). Cellular device/smartphone 600B can include a user interface (e.g., a screen or touchscreen) 630 and an RGB-D camera, as shown by separate RGB camera 632 and depth (D) 634 camera. Smartphone 600B may have more than two cameras, e.g., it can have three (632, 634, 636) as shown. The additional camera(s), e.g., camera 636, may be of any type, e.g., long-distance, high-resolution, black-and-white, another visible camera, or another LIDAR sensor. An RGB-D camera—indicated by RGB camera 632 and depth (D) camera 634—may be configured at any position(s) on cellular device/smartphone 600B. For example, RGB-D camera—indicated by RGB camera 632 and depth (D) camera 634—can be on either or both major surfaces (major sides or "front" and "back") of smartphone 600B, as shown. Cellular device/smartphone 600B can include functionality for wireless communication, e.g., according to any of a number of wireless transmission protocols or air interface standards. Cellular device/smartphone 600B can implement embodiments of the present disclosure, e.g., method 100 of FIG. 1, a method as claimed, and/or a similar method in accordance with the present disclosure.

Accordingly, embodiments of the present disclosure contrast with existing (prior art) depth-enabled solutions that use either an early fusion approach which fits a 3D model directly to the RGB-D image and computes distances directly from the fitted model landmarks (prone to underfitting) or a late-fusion approach that measures 2D landmark distances after projection into the depth frame without any coplanarity constraints. Embodiments of the present disclosure can perform late fusion with coplanarity constraints to improve accuracy and robustness over existing prior art solutions. An embodiment/example of the present disclosure was implemented (reduced to practice) in iOS using ARKit and Mediapipe.

Exemplary Embodiments

An exemplary embodiment can include a system for measuring coplanar point distances using an RGB-D camera, the system comprising:

a memory (e.g., one or more memory units or integrated circuits) including computer-executable instructions; and one or more processors (e.g., a DSP, CPU, and/or GPU) coupled to the memory and operative to execute the computer-executable instructions, the computer-executable instructions causing the one or more processors to:

(i) use a landmark detector to identify and track coplanar points across one or more (e.g., multiple) frames of video captured by RGB-D camera;

(ii) use a coarse object pose estimator to constrain the rotation angle of the camera relative to the measurement object (e.g., a region of a person's face including eyes and nose);

(iii) synchronize and fuse color and depth channels;

(iv) use the corresponding camera projection matrices and the known extrinsic parameters, describing the transformation between color and depth sensors, to project landmark detections from the color image into the depth image;

(v) enforce (or facilitate enforcement of) the coplanarity and parallelity of the measured landmarks, calculating and thresholding the difference between the depths of each pair of coplanar points, such that all values above the threshold are discarded;

(vi) flatten coplanar landmark sets are flattened such that each landmark in the set shares the depth value of the perceived nearest landmark to the camera, to mitigate potentially noisy depth sensor measurements;

(vii) project each landmark is then projected into world coordinates using the depth sensor's known intrinsic parameters (referring to intrinsic parameters representing the optical center, focal length, and distortions of the camera); and (viii) calculate the distance (e.g., metric distance) between the points.

Processing may be performed by one or more programmable processors executing one or more computer programs to perform the functions of the system. In some embodiments, all or part of the system may be implemented as special purpose logic circuitry, e.g., an FPGA (field programmable gate array) and/or an ASIC (application-specific integrated circuit). In some examples, digital logic circuitry, e.g., one or more FPGAs, can be operative as a processor as described herein.

Accordingly, embodiments of the inventive subject matter can afford various benefits relative to prior art techniques. For example, embodiments and examples of the present disclosure can enable or facilitate a myriad of high-accuracy consumer applications on smartphones with integrated depth cameras. By enabling a quick and easy-to-use user experience, while maintaining clinically accurate results for consumers with high prescriptions, embodiments and examples of the present disclosure can, e.g., reduce purchasing friction (reluctance) for those online customers that were previously directed to see their optometrist.

Various embodiments of the concepts, systems, devices, structures, and techniques sought to be protected are described above with reference to the related drawings. Alternative embodiments can be devised without departing from the scope of the concepts, systems, devices, structures, and techniques described.

It is noted that various connections and positional relationships (e.g., over, below, adjacent, etc.) may be used to describe elements and components in the description and drawings. These connections and/or positional relationships, unless specified otherwise, can be direct or indirect, and the described concepts, systems, devices, structures, and techniques are not intended to be limiting in this respect. Accordingly, a coupling of entities can refer to either a direct or an indirect coupling, and a positional relationship between entities can be a direct or indirect positional relationship.

As an example of an indirect positional relationship, positioning element "A" over element "B" can include situations in which one or more intermediate elements (e.g., element "C") is between elements "A" and elements "B" as long as the relevant characteristics and functionalities of elements "A" and "B" are not substantially changed by the intermediate element(s).

Also, the following definitions and abbreviations are to be used for the interpretation of the claims and the specification. The terms "comprise," "comprises," "comprising," "include," "includes," "including," "has," "having," "contains" or "containing," or any other variation are intended to cover a non-exclusive inclusion. For example, an apparatus, a method, a composition, a mixture, or an article that includes a list of elements is not necessarily limited to only those elements but can include other elements not expressly listed or inherent to such apparatus, method, composition, mixture, or article.

Additionally, the term "exemplary" means "serving as an example, instance, or illustration. Any embodiment or design described as "exemplary" is not necessarily to be construed as preferred or advantageous over other embodiments or designs. The terms "one or more," "plurality," and "at least one" indicate any integer number greater than or equal to one, e.g., one, two, three, four, etc.; though, where context admits, each of those terms can include reference to a fractional value greater that one. The term "connection" can include an indirect "connection" and a direct "connection".

References in the specification to "embodiments," "one embodiment, "an embodiment," "an example embodiment," "an example," "an instance," "an aspect," etc., indicate that the embodiment described can include a particular feature, structure, or characteristic, but every embodiment may or may not include the particular feature, structure, or characteristic. Moreover, such phrases do not necessarily refer to the same embodiment. Further, when a particular feature, structure, or characteristic is described in connection with an embodiment, it may affect such feature, structure, or characteristic in other embodiments whether explicitly described or not.

Relative or positional terms including, but not limited to, the terms "upper," "lower," "right," "left," "vertical," "horizontal, "top," "bottom," and derivatives of those terms relate to the described structures and methods as oriented in the drawing figures. The terms "overlying," "atop," "on top, "positioned on" or "positioned atop" mean that a first element, such as a first structure, is present on a second element, such as a second structure, where intervening elements such as an interface structure can be present between the first element and the second element. The term "direct contact" means that a first element, such as a first structure, and a second element, such as a second structure, are connected without any intermediary elements.

Use of ordinal terms such as "first," "second," "third," etc., in the claims to modify a claim element does not by itself connote any priority, precedence, or order of one claim element over another, or a temporal order in which acts of a method are performed but are used merely as labels to distinguish one claim element having a certain name from another element having a same name (but for use of the ordinal term) to distinguish the claim elements.

The terms "approximately" and "about" may be used to mean within ±20% of a target (or nominal) value in some embodiments, within plus or minus (±) 10% of a target value in some embodiments, within ±5% of a target value in some embodiments, and yet within ±2% of a target value in some embodiments. The terms "approximately" and "about" may include the target value. The term "substantially equal" may be used to refer to values that are within ±20% of one another in some embodiments, within ±10% of one another in some embodiments, within ±5% of one another in some embodiments, and yet within ±2% of one another in some embodiments.

The term "substantially" may be used to refer to values that are within ±20% of a comparative measure in some embodiments, within ±10% in some embodiments, within ±5% in some embodiments, and yet within ±2% in some embodiments. For example, a first direction that is "substantially" perpendicular to a second direction may refer to a first direction that is within ±20% of making a 90° angle with the second direction in some embodiments, within ±10% of making a 90° angle with the second direction in some embodiments, within ±5% of making a 90° angle with the second direction in some embodiments, and yet within ±2% of making a 90° angle with the second direction in some embodiments.

The disclosed subject matter is not limited in its application to the details of construction and to the arrangements of the components set forth in the following description or illustrated in the drawings. The disclosed subject matter is capable of other embodiments and of being practiced and carried out in various ways.

Also, the phraseology and terminology used in this patent are for the purpose of description and should not be regarded as limiting. As such, the conception upon which this disclosure is based may readily be utilized as a basis for the designing of other structures, methods, and systems for carrying out the several purposes of the disclosed subject matter. Therefore, the claims should be regarded as including such equivalent constructions as far as they do not depart from the spirit and scope of the disclosed subject matter.

Although the disclosed subject matter has been described and illustrated in the foregoing exemplary embodiments, the present disclosure has been made only by way of example. Thus, numerous changes in the details of implementation of the disclosed subject matter may be made without departing from the spirit and scope of the disclosed subject matter.

Accordingly, the scope of this patent should not be limited to the described implementations but rather should be limited only by the spirit and scope of the following claims.

All publications and references cited in this patent are expressly incorporated by reference in their entirety.

What is claimed is:

1. A system for measuring coplanar point distances of facial features using an RGB-D camera, the system comprising:

an RGB-D camera having an RGB camera and a depth (D) camera, wherein the RGB camera includes an RGB sensor and is configured to produce output signals on an RGB channel corresponding to one or more RGB images, and wherein the depth camera includes a depth sensor and is configured to produce output signals on a depth channel corresponding to one or more depth images;

a memory including computer-executable instructions; and a processor coupled to the memory and operative to execute the computer-executable instructions, the computer-executable instructions causing the processor to perform operations including:

(i) using a landmark detector to detect one or more pairs of coplanar points as symmetric landmark pairs in one or more color images of a user's face captured by the RGB-D camera, wherein each symmetric landmark pair corresponds to symmetrical facial features of the user, respectively;

(ii) fusing color and depth channels corresponding to the RGB camera and the depth camera of the RGB-D camera, respectively, by using corresponding camera projection matrices and extrinsic parameters to project the detected symmetric landmark pairs from the one or more color images into corresponding one or more depth images, wherein the camera projection matrices define camera lens and sensor intrinsic parameters, and wherein the extrinsic parameters describe a transformation between the color and depth sensors;

(iii) enforcing coplanarity and parallelity of the detected symmetric landmark pairs;

(iv) flattening each symmetric landmark pair by assigning both landmarks the lesser of the pair's two depth values to mitigate potentially noisy depth sensor measurements, thereby reducing asymmetric sensor bias and noise of the RGB-D camera;

(v) projecting each landmark into world coordinates using the intrinsic parameters of the depth sensor, wherein the intrinsic parameters include the optical center and focal length of the depth camera; and (vi) calculating a point distance between the points of one symmetric landmark pair in the world coordinates of the depth sensor.

2. The system of claim 1, wherein the calculated point distance comprises a pupillary distance.

3. The system of claim 1, wherein the processor is further configured to use a coarse object pose estimator to constrain a rotation angle of the camera relative to the user.

4. The system of claim 1, wherein the one or more images comprise a plurality of frames of video from the RGB-D camera.

5. The system of claim 1, wherein fusing the color and depth channels further comprises synchronizing the color and depth channels.

6. The system of claim 1, wherein using the landmark detector comprises using a convolutional neural network.

7. The system of claim 1, wherein using the landmark detector comprises using a deep landmark detection network.

8. The system of claim 1, wherein using the landmark detector comprises edge detection.

9. The system of claim 1, wherein using the landmark detector comprises using an optical flow algorithm.

10. The system of claim 1, wherein using the landmark detector comprises using a facial landmark detection model.

11. The system of claim 1, wherein using the landmark detector comprises using SIFT or SURF as a feature-based methodology.

12. The system of claim 1, wherein the processor is configured to calculate the distance between the points using the Cartesian distance formula.

13. The system of claim 1, wherein the processor is further configured to apply a temporal filter to successive values of the calculated point distance between the points.

14. The system of claim 1, wherein the processor is further configured to incorporate a vergence adjustment into the calculated point distance, wherein the two points correspond to pupils of a user, and wherein the calculated distance comprises an interpupillary distance (IPD).

15. A method of using an RGB-D camera for measuring coplanar point distances of facial features, wherein the RGB-D camera includes an RGB camera and a depth (D) camera, and wherein the RGB-D camera is connected to memory and a processor, the method comprising:

(i) using a landmark detector to detect one or more pairs of coplanar points as symmetric landmark pairs in one or more color images of a user's face captured by the RGB-D camera, wherein each symmetric landmark pair corresponds to symmetrical facial features of the user, respectively;

(ii) fusing color and depth channels corresponding to the RGB camera and the depth camera of the RGB-D camera, respectively, by using corresponding camera projection matrices and extrinsic parameters to project the detected symmetric landmark pairs from the one or more color images into corresponding one or more depth images, wherein the camera projection matrices define camera lens and sensor intrinsic parameters, and wherein the extrinsic parameters describe a transformation between the color and depth sensors;

(iii) enforcing coplanarity and parallelity of the detected symmetric landmark pairs;

(iv) flattening each symmetric landmark pair by assigning both landmarks the lesser of the pair's two depth values to mitigate potentially noisy depth sensor measurements, thereby reducing metric sensor bias and noise of the RGB-D camera;

(v) projecting each landmark into world coordinates using the intrinsic parameters of the depth sensor, wherein the intrinsic parameters include the optical center and focal length of the depth camera; and (vi) calculating a point distance between the points of one symmetric landmark pair in the world coordinates of the depth sensor.

16. The method of claim 15, wherein the calculated point distance comprises a pupillary distance.

17. The method of claim 15, wherein the processor is further configured to use a coarse object pose estimator to constrain a rotation angle of the camera relative to the user.

18. The method of claim 15, wherein the one or more images comprise a plurality of frames of video from the RGB-D camera.

19. The method of claim 15, wherein fusing the color and depth channels further comprises synchronizing the color and depth channels.

20. The method of claim 15, wherein using the landmark detector comprises using a convolutional neural network.

21. The method of claim 15, wherein using the landmark detector comprises using a deep landmark detection network.

22. The method of claim 15, wherein using the landmark detector comprises edge detection.

23. The method of claim 15, wherein using the landmark detector comprises using an optical flow algorithm.

24. The method of claim 15, wherein using the landmark detector comprises using a facial landmark detection model.

25. The method of claim 15, wherein using the landmark detector comprises using SIFT or SURF as a feature-based methodology.

26. The method of claim 15, wherein the processor is configured to calculate the distance between the points using the Cartesian distance formula.

27. The method of claim 15, wherein the processor is further configured to apply a temporal filter to successive values of the calculated point distance between the points.

28. The method of claim 15, wherein the processor is further configured to incorporate a vergence adjustment into the calculated point distance, wherein the two points correspond to pupils of a user, and wherein the calculated distance comprises an interpupillary distance (IPD).

29. A non-transitory computer readable storage medium including computer executable instructions for measuring coplanar point distances of facial features using an RGB-D camera, which when read by a processor cause the processor to perform operations including:

(i) using a landmark detector to detect one or more pairs of coplanar points as symmetric landmark pairs in one or more color images of a user's face captured by the RGB-D camera, wherein each symmetric landmark pair corresponds to symmetrical facial features of the user, respectively;

(ii) fusing color and depth channels corresponding to the RGB camera and the depth camera of the RGB-D camera, respectively, by using corresponding camera projection matrices and extrinsic parameters to project the detected symmetric landmark pairs from the one or more color images into corresponding one or more depth images, wherein the camera projection matrices define camera lens and sensor intrinsic parameters, and wherein the extrinsic parameters describe a transformation between the color and depth sensors;

(iii) enforcing coplanarity and parallelity of the detected symmetric landmark pairs;

(iv) flattening each symmetric landmark pair by assigning both landmarks the lesser of the pair's two depth values to mitigate potentially noisy depth sensor measurements, thereby reducing asymmetric sensor bias and noise of the RGB-D camera;

(v) projecting each landmark into world coordinates using the intrinsic parameters of the depth sensor, wherein the intrinsic parameters include the optical center and focal length of the depth camera; and (vi) calculating a point distance between the points of one symmetric landmark pair in the world coordinates of the depth sensor.

30. The non-transitory storage medium of claim 29, wherein the calculated point distance comprises a pupillary distance.

31. The non-transitory storage medium of claim 29, wherein the processor is further configured to use a coarse object pose estimator to constrain a rotation angle of the camera relative to the user.

32. The non-transitory storage medium of claim 29, wherein the one or more images comprise a plurality of frames of video from the RGB-D camera.

33. The non-transitory storage medium of claim 29, wherein fusing the color and depth channels further comprises synchronizing the color and depth channels.

34. The non-transitory storage medium of claim 29, wherein using the landmark detector comprises using a convolutional neural network.

35. The non-transitory storage medium of claim 29, wherein using the landmark detector comprises using a deep landmark detection network.

36. The non-transitory storage medium of claim 29, wherein using the landmark detector comprises edge detection.

37. The non-transitory storage medium of claim 29, wherein using the landmark detector comprises using an optical flow algorithm.

38. The non-transitory storage medium of claim 29, wherein using the landmark detector comprises using a facial landmark detection model.

39. The non-transitory storage medium of claim 29, wherein using the landmark detector comprises using SIFT or SURF as a feature-based methodology.

40. The non-transitory storage medium of claim 29, wherein the processor is configured to calculate the distance between the points using the Cartesian distance formula.

41. The non-transitory storage medium of claim 29, wherein the processor is further configured to apply a temporal filter to successive values of the calculated point distance between the points.

42. The non-transitory storage medium of claim 29, wherein the processor is further configured to incorporate a vergence adjustment into the calculated point distance, wherein the two points correspond to pupils of a user, and wherein the calculated distance comprises an interpupillary distance (IPD).

* * * * *